United States Patent [19]

Yamada

[11] Patent Number: 4,771,301

[45] Date of Patent: Sep. 13, 1988

[54] APPARATUS FOR FLASH PHOTOGRAPHY

[75] Inventor: Masanori Yamada, Kanagawa, Japan

[73] Assignee: Canon Kabushiki Kaisha, Tokyo, Japan

[21] Appl. No.: 112,076

[22] Filed: Oct. 26, 1987

[30] Foreign Application Priority Data

Nov. 1, 1986 [JP] Japan ................................. 61-261125

[51] Int. Cl.[4] ...................... G03B 15/05; H05B 41/34
[52] U.S. Cl. .................................... 354/132; 315/151; 315/152; 315/241 P; 315/323; 354/424
[58] Field of Search ................ 354/132, 424; 315/151, 315/152, 241 P, 323

[56] References Cited

U.S. PATENT DOCUMENTS 4,360,764 11/1982 Yagi ..................................... 315/151
4,384,238 5/1983 Greenwald et al. ................ 315/151

Primary Examiner—Michael L. Gellner
Attorney, Agent, or Firm—Fitzpatrick, Cella, Harper & Scinto

[57] ABSTRACT

An apparatus for flash photography being of the type in which for one shot a number of different flash tubes are time-serially fired and the amount of flash light emitted from each flash tube is controlled in accordance with a respective arbitrarily chosen individual value independently of the others.

In the above-described arrangement, one and the same comparator is sufficient for controlling the firing operation of all the flash tubes, thereby giving an advantage of simplifying the construction of the apparatus.

10 Claims, 3 Drawing Sheets

APPARATUS FOR FLASH PHOTOGRAPHY

BACKGROUND OF THE INVENTION

1. Field of the Invention

This invention relates to an apparatus for flash photography and, more particularly, to an apparatus of the type in which a plurality of electronic flash units are fired for each shot and the amounts of flash light issued from the units are adjusted to respective desired values.

2. Description of the Related Art

In the above-identified type of apparatus for flash photography, as the means for detecting whether or not the amounts of flash light issued from the individual electronic flash units have reached their respective preset levels, use has been made of an equal number of comparators to the number of units, as for example disclosed in U.S. Pat. No. 4,360,764. The use of so large a number of comparators gave rise to a problem of increasing the scale of the flash exposure control circuit.

SUMMARY OF THE INVENTION

With the foregoing in mind, one aspect of the present invention is to provide an apparatus for flash photography in which the reference values for the electronic flash units are selectively rendered cooperative with one and the same comparator in response to a light amount control operation of each flash unit. Hence, one comparator suffices for controlling the firing operation of all the units. Thus, the above-described drawback of the prior known apparatus has been eliminated.

Another aspect of the present invention is, under the above-described object, to provide an apparatus for flash photography in which the reference voltage for the above-identified comparator is changed over from one value to another each time the controlling of flash light amount of the corresponding one of the electronic flash units terminates. Thus, making it possible to adjust the amounts of flash light issued from the units in accordance with the respective arbitrarily preset fractions of a flash exposure value.

Other objects of the invention will become apparent from the following description of embodiments thereof by reference to the drawings:

DETAILED DESCRIPTION OF THE PREFERRED EMBODIMENTS

Figure 1:
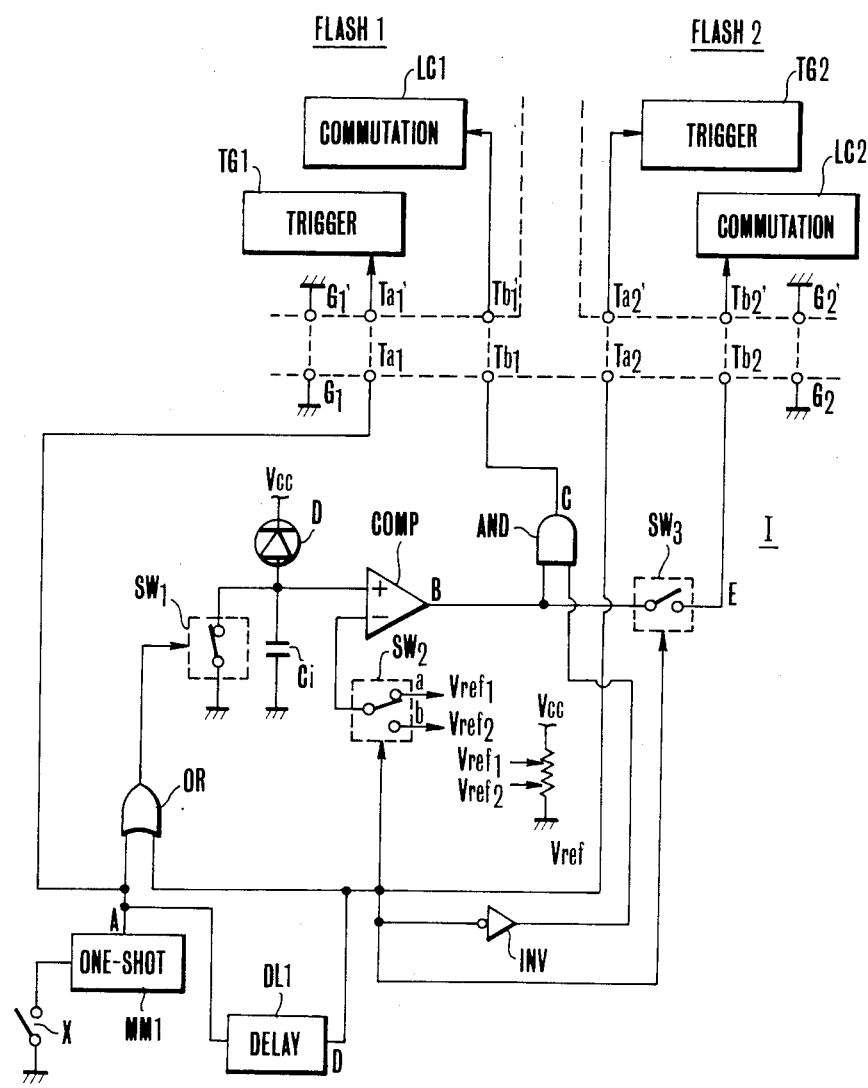
FIG. 1 is an electrical circuit diagram illustrating one embodiment of the apparatus for flash photography according to the invention.

In FIG. 1, the apparatus of the invention comprises a camera whose circuitry is shown by I associated with first and second electronic flash units Flash 1 and Flash 2 respectively.

The above-described electronic flash units are well known. So, their detailed explanation is omitted except that they include respectively trigger circuits $TG_1$ and $TG_2$ responsive to closure of the synchro switch or an actuating signal of high level coming therefrom through the interconnection terminals $Ta_1'$ and $Ta_2'$ for initiating a firing operation of a flash tube (not shown) and commutation circuits $LC_1$ and $LC_2$ responsive to a de-actuating signal coming through interconnection terminals $Tb_1'$ and $Tb_2'$ for stopping the firing operation.

The circuit I in the camera includes a synchro switch X turned on in response to movement of a first curtain of a shutter, a one-shot circuit $MM_1$ responsive to closure of the synchro switch X for producing the actuating signal which is maintained at a high level for a predetermined time, its output being connected to an interconnection terminal $Ta_1$ in contact with the one $Ta_1'$, a switch $SW_1$ turned off in response to change of the output of an OR gate OR to a high level as the actuating signal arrives, and maintained in the off state for the same time when the actuating signal is present, a capacitor Ci to which the switch $SW_1$ is connected in parallel, and a photosensitive element D connected to the capacitor Ci to constitute an integration circuit together with the latter. This photosensitive element D is positioned to receive the reflection of light entering through the photographic lens of the camera from a film surface.

COMP denotes a comparator whose plus input is connected to the output of the above-described integration circuit and whose minus input is connected to a selection switch $SW_2$ for two reference voltages $Vref_1$ and $Vref_2$ from a reference signal source Vref. Its output at which the above-described de-actuating or firing stop signal is produced is connected to the commutation circuits $LC_1$ and $LC_2$ in the electronic flash units Flash 1 and Flash 2 through an AND gate AND and a switch $SW_3$ respectively.

Responsive to the aforesaid change of the output signal of the one-shot circuit $MM_1$ (to a high level), a delay circuit $DL_1$ changes its output to a high level in a predetermined time and holds that high level signal for a predetermined time. The output of this delay circuit $DL_1$ is connected to the aforesaid OR gate and switches $SW_2$ and $SW_3$ and an inverter INV.

The switch $SW_2$ moves from its "a" to its "b" position in response to the high level signal of the delay circuit $DL_1$, and holds the latter position during the time when that signal is at a high level. Also, the switch $SW_3$ turns on in response to the high level signal of the delay circuit $DL_1$ and stays in the on state during the time when that signal is at a high level.

The time $T_1$ for which the one-shot circuit $MM_1$ is on is determined to be almost equal to the full firing time of the first electronic flash unit Flash 1, and the interval $T_D$ from the moment at which the one-shot circuit $MM_1$ has started to produce the high level signal to the moment at which the delay circuit $DL_1$ starts to produce the high level signal is determined to be slightly longer than the aforesaid time $T_1$. The duration of this high level signal of the delay circuit $DL_1$ is determined to be almost equal to the full firing time of the second electronic flash unit Flash 2.

Figure 2:
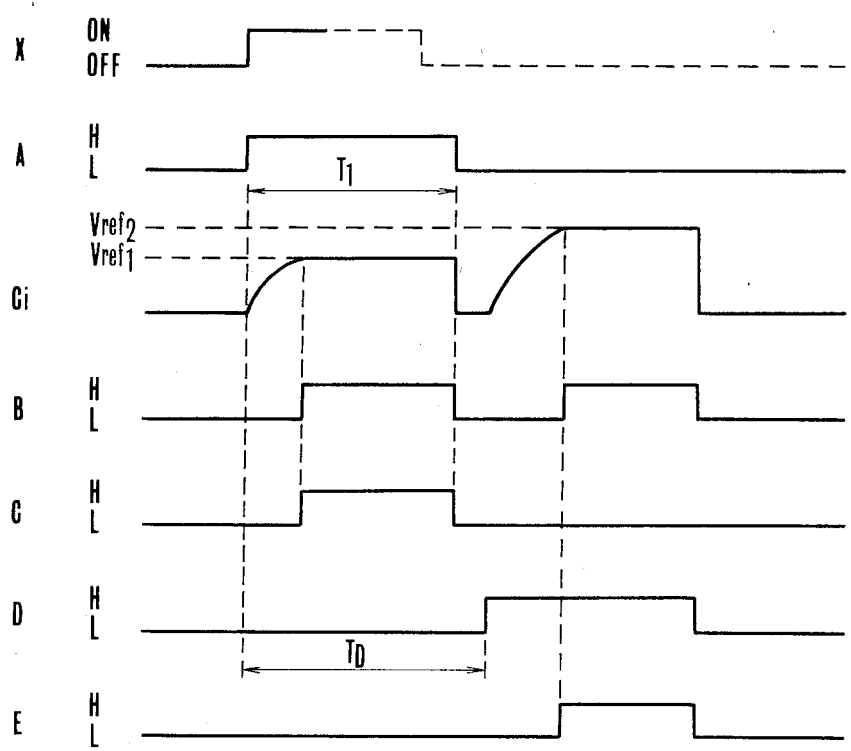
FIG. 2 is a pulse timing chart illustrating the manner in which the circuit of FIG. 1 operates.

The operation of the FIG. 1 embodiment is described by using the waveforms of FIG. 2.

It is now assumed that the terminals $Ta_1$, $Tb_1$, $Ta_2$ and $Tb_2$ and grounds $G_1$ and $G_2$ of the camera are in contact with the terminals $Ta_1'$, $Tb_1'$, $Ta_2'$ and $Tb_2'$ and the grounds $G_1'$ and $G_2'$ of the electronic flash units Flash 1 and Flash 2, respectively.

With this state, when the camera is released, the first curtain of the shutter runs down to turn on the synchro switch X as shown on line X in FIG. 2. Thereby the one-shot circuit $MM_1$ produces a pulse as shown on line A in FIG. 2. In synchronism with its rising edge, the trigger circuit $TG_1$ in the first flash unit Flash 1 fires the discharge tube.

The high level signal of the one-shot circuit $MM_1$ is given also to the switch $SW_1$ and the latter turns off. The flash light from the first flash unit Flash 1 is projected onto an object being photographed, and reflected past the lens of the camera to illuminate the film surface. The reflected light from this film surface is received by the photosensitive element D. The integrated amount of light on the element D appears in the form of increasing voltages on the capacitor Ci as shown on line Ci in FIG. 2. The output of the integrator is compared with the first reference voltage $Vref_1$. When it reaches the voltage $Vref_1$, the comparator COMP inverts its output to the high level as shown on line B in FIG. 2. This output is applied through the AND gate AND to the commutation circuit $LC_1$ in the first flash unit Flash 1, thus stopping its discharge tube from further firing.

Since the reference voltage $Vref_1$ is preset to a desired value by means of an operating member (not shown) which can change the position of the tap of the reference voltage source Vref, the predetermined light amount desired by the photographer can be obtained from the first flash unit Flash 1. After that, when the output of the one-shot circuit $MM_1$ inverts to the low level, the switch $SW_1$ turns on to discharge the charge on the capacitor Ci. Thus, the integrator is reset to the initial state.

In a very short time, the delay circuit $DL_1$ changes its output to the high level as shown on line D in FIG. 2, thereby the trigger circuit $TG_2$ in the second electronic flash unit Flash 2 is actuated. So, the second electronic flash unit Flash 2 starts to fire. Such change also causes the switch $SW_1$ to turn off again. Hence, the amount of flash light emitted from the second flash unit Flash 2 starts to be integrated on the photosensitive element D.

Also because the high level signal of the delay circuit $DL_1$ travels to the switch $SW_3$, the latter turns on. The switch $SW_2$ also is moved to its "b" position.

When the output of the integrator reaches the second reference voltage $Vref_2$, the comparator COMP produces an output signal of a high level which is applied through the switch $SW_3$ to the commutation circuit $LC_2$ in the second flash unit Flash 2, stopping the second flash unit Flash 2 from further firing. Since the second reference voltage $Vref_2$ also can be preset to a desired value in a similar way to that of the first one $Vref_1$, the amount of flash light emitted from the flash units Flash 1 and Flash 2 can be adjusted to arbitrary values independently of each other.

Figure 3:
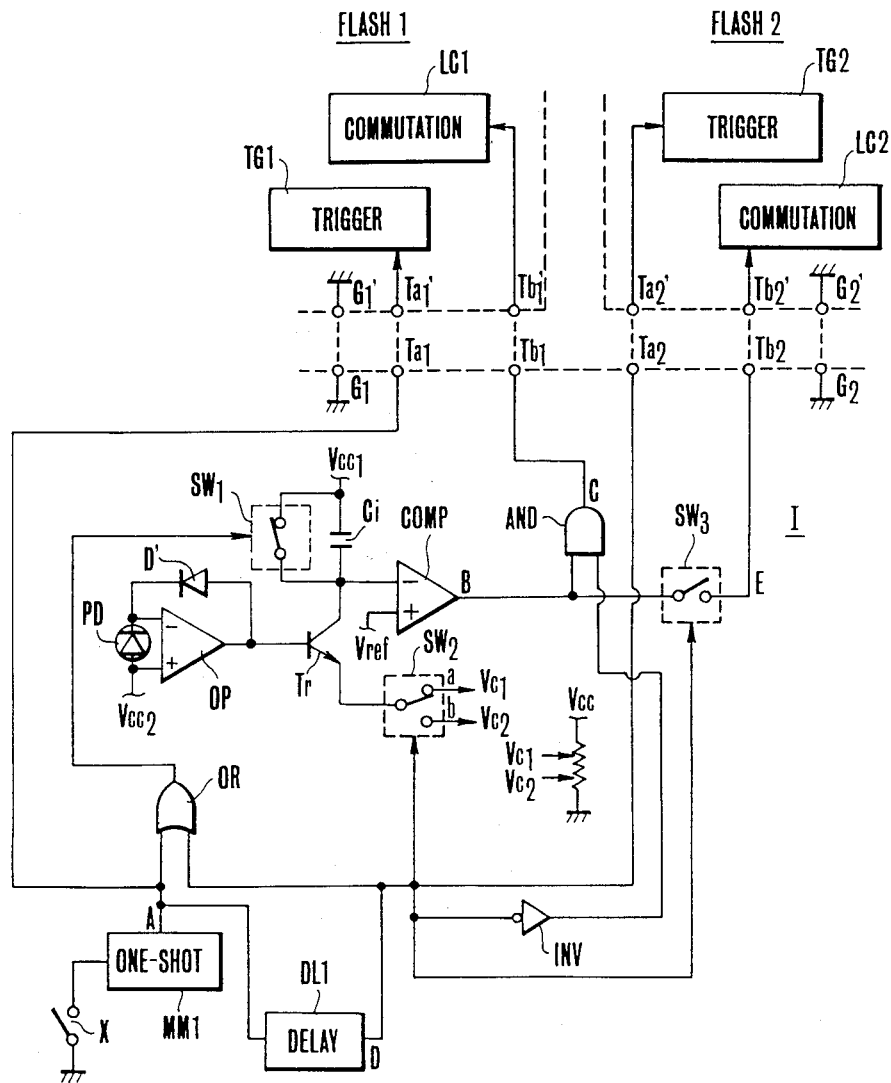
FIG. 3 is an electrical circuit diagram of another embodiment of the invention.

Another embodiment of the invention is shown in FIG. 3 where the similar constituent parts to those shown in FIG. 1 are denoted by the same reference characters.

This embodiment differs from the FIG. 1 embodiment in the points that the photosensitive element PD is connected across the inputs of an operational amplifier OP with a diode D' as the logarithmic compression element connected in its feedback loop to form a logarithmic compression circuit which is employed as the light metering circuit, that further use is made of a transistor Tr for logarithmic expansion whose base is connected to the output of the operational amplifier OP so that the capacitor Ci is charged with the collector current of the transistor Tr, and that the first and second reference voltages $VC_1$ and $VC_2$ are made selectively applicable to the emitter of the transistor Tr by means of the switch $SW_2$.

The operation of the circuit of FIG. 3 is described below. When the synchro switch X turns on, the one-shot circuit $MM_1$ produces the pulse and a first electronic flash unit Flash 1 fires. At this point in time, the switch $SW_1$ turns off. These operations are the same as those of the FIG. 1 embodiment. The reflection of the flash light of the first flash unit Flash 1 from the object being photographed is received by the photosensitive element PD. An information representing the logarithm of the object brightness level is produced at the output of the operational amplifier OP. This output is then expanded by the transistor Tr. Therefore, the capacitor Ci is charged with the corresponding current to the output of the operational amplifier OP through the transistor Tr. For this case, since the reference voltage $VC_1$ is applied through the switch $SW_2$ to the emitter of the transistor Tr, the intensity of the collector current of the transistor Tr is determined by the value of the reference voltage $VC_1$ too. After a time depending on the preset value of the reference voltage $VC_1$ and the output of the light metering circuit, the voltage on the capacitor Ci reaches the reference voltage Vref, and the comparator COMP produces an output signal of high level, thus stopping the firing of the first flash unit Flash 1 likewise as in the FIG. 1 embodiment.

After that, the delay circuit $DL_1$ produces an output signal of a high level. Similarly to the FIG. 1 embodiment, the second electronic flash unit Flash 2 fires. Current of the corresponding intensity to the reflection of the flash light of the second flash unit Flash 2 from the object being photographed flows to and is stored on the capacitor Ci. Since, at this time, the switch $SW_2$ is in its "b" position, the charging current to the capacitor Ci goes to a value depending on the output of the operational amplifier OP and the second reference voltage $VC_2$. Therefore, the time during which the voltage on the capacitor Ci reaches the reference voltage Vref is determined by the light value and the preset value of the reference voltage $VC_2$. When the capacitor Ci is charged to the equal potential to the reference voltage Vref, the second flash unit Flash 2 gets stopped from further firing.

These reference voltages $VC_1$ and $VC_2$ can be preset to desired values. Hence, the amounts of light emitted from the flash units Flash 1 and Flash 2 can be adjusted to the desired values independently of each other. Although in the foregoing, the embodiments, the electronic flash units have been described as the separate items from each other, they may otherwise be unified in such a way that the two firing circuits are built in the same casing of electronic flash unit, and arranged to be time-serially actuated.

It is to be noted that another construction may be considered as a modification of the embodiment of the invention. For example, in FIGS. 1 and 3, the delay circuit $DL_1$ may be disconnected from the one-shot circuit $MM_1$ and be triggered by an output of the AND gate AND, while the trigger circuit $TG_2$ may be disconnected from the delay circuit $DL_1$ and be connected to an output of the one-shot circuit $MM_1$. In such a construction, the flash light amount of each of the electronic flash units Flash 1 and Flash 2 can be controlled in a condition where both the flash units Flash 1 and Flash 2 fire simultaneously.

As has been described above, in the present invention, for controlling the termination of the firing operation in accordance with the received amount of light, use is made of means for changing the reference value with which the output of the integrator for the received light is compared each time the firing is transferred unti to unit. This makes it possible to simplify the structure of construction of the apparatus for flash photography of the type in which one shot is taken with multiple flashes, while the amount of flash light emitted from each flash unit is controlled in accordance with a corresponding arbitrarily chosen fraction of a flash exposure.

What is claimed is:

1. A flash exposure control apparatus having a plurality of flash tubes fired successively when shooting one picture frame so that a flash exposure is made with multiple flashes, comprising:
    (a) a light receiving circuit for receiving the reflection of the flash light of the fired ones of said flash tubes from an object being photographed;
    (b) an integration circuit for integrating the output of said light receiving circuit;
    (c) a comparator circuit responsive to attainment of the output of said integration circuit to a predetermined level for producing an output;
    (d) a firing control circuit for actuating said flash tubes to fire successively in time displaced relation;
    (e) a firing stop control circuit for stopping the ones of said flash tubes which have been fired by said firing control circuit from further firing each time the production of an output from said comparator circuit is recycled; and
    (f) a selection circuit for changing said predetermined level of said comparator circuit from one value to another each time the firing is stopped as said flash tubes have time-serially been fired.

2. An apparatus according to claim 1, further comprising an integration control circuit for resetting said integration circuit to the initial state each time the firing of any one of said flash tube stops and then causing an initiation of integration for the output of said light receiving circuit.

3. An apparatus according to claim 1 or 2, further comprising a presetting circuit for presetting desired values of the predetermined level which are to be selectively taken to said comparator by said selection circuit.

4. A flash exposure control apparatus having a plurality of flash tubes fired successively when shooting one picture frame so that a flash exposure is made with multiple flashes, comprising:
    (a) a light receiving circuit for receiving the reflection of the flash light of the fired ones of said flash tubes from an object being photographed;
    (b) an integration circuit for integrating the output of said light receiving circuit;
    (c) an adjusting circuit for adjusting the integration speed for the output of said light receiving circuit by said integration circuit, said circuit having information setting means for setting information, whereby said integration speed is adjusted in accordance with said set information;
    (d) a comparator circuit responsive to attainment of the output of said integration circuit to a predetermined level for producing an output;
    (e) a firing control circuit for actuating said flash tubes to fire successively in time displaced relation;
    (f) a firing stop control circuit for stopping the ones of said flash tubes which have been fired by said firing control circuit from further firing each time the production of an output from said comparator circuit is recycled; and
    (g) a selection circuit for selecting one of set values of information by said information setting means each time the firing stops as said flash tubes have time-serially been fired.

5. An apparatus according to claim 4, further comprising an integration control circuit for resetting said integration circuit to the initial state each time the firing of any one of said flash tube stops and then causing an initiation of integration for the output of said light receiving circuit.

6. An apparatus according to claim 4 or 5, wherein said adjusting circuit controls the intensity of current to be integrated by said integration circuit in accordance with the selected one of the preset values of information and the output of said light receiving circuit.

7. An apparatus according to claim 4 or 5, wherein said light receiving circuit includes an operational amplifier having input terminals across which is connected a photosensitive element with a logarithmic compression element connected in a feedback loop thereof and is provided with a transistor whose base is connected to the output of said operational amplifier, to the emitter of which is applied the corresponding voltage to said selected one of said preset values of information, and by the collector current of which is used in operating said integration circuit.

8. A flash exposure control apparatus having a plurality of flash tubes fired successively when shooting one picture frame so that a flash exposure is made with multiple flashes, comprising:
    (a) a light receiving circuit for receiving the reflection of the flash light of the fired ones of said flash tubes from an object being photographed;
    (b) an integration circuit for integrating the output of said light receiving circuit;
    (c) a comparator circuit responsive to attainment of the output of said integration circuit to a predetermined level for producing an output;
    (d) a firing control circuit for actuating said flash tubes to fire successively in time displaced relation;
    (e) a firing stop control circuit for stopping the ones of said flash tubes which have been fired by said firing control circuit from further firing each time the production of an output from said comparator circuit is recycled; and
    (f) information presetting means;
    (g) an adjusting circuit for adjusting the time from the start of integration by said integration circuit to the production of an output from said comparator circuit in accordance with the output of said light receiving circuit and the preset value of information by said information presetting means; and
    (h) a selection circuit for selecting one of said preset values of information by said information presetting means each time the firing stops as said flash tubes have time-serially been fired.

9. A flash exposure control apparatus having a plurality of flash tubes fired when shooting one picture frame, comprising:
    (a) a light receiving circuit for receiving the reflection of flash light of the fired flash tubes from an object being photographed;
    (b) an integration circuit for integrating an output of said light receiving circuit;
    (c) a comparator circuit responsive to attainment of an output of said integration circuit to a predetermined level for producing an output;

(d) a firsing stop control circuit for selectively and sequentially stopping the firing of each of the flash tubes in response to the output of said comparator circuit each time said comparator circuit produces the output; and (e) a selection circuit for sequentially changing the predetermined level of said comparator circuit each time the firing of each of the flash tubes is stopped by said firing stop control circuit.

10. A flash exposure control apparatus having a plurality of flash tubes fired when shooting one picture frame, comprising:

(a) a light receiving circuit for receiving the reflection of flash light of the fired flash tubes from an object being photographed;

(b) an integration circuit for integrating an output of said light receiving circuit;

(c) an adjusting circuit for adjusting the integration speed for the output of said light receiving circuit by said integration circuit, said circuit having information setting means for setting information, whereby said integration speed is adjusted in accordance with said set information;

(d) a comparator circuit responsive to attainment of an output of said integration circuit to a predetermined level for producing an output;

(e) a firing stop control circuit for selectively and sequentially stopping the firing of each of the flash tubes in response to the output of said comparator circuit each time said comparator circuit produces the output; and (f) a selection circuit for sequentially changing the information set by said information setting means each time the firing of each of the flash tubes is stopped by said firing stop control circuit.

* * * * *

UNITED STATES PATENT AND TRADEMARK OFFICE
CERTIFICATE OF CORRECTION

PATENT NO. : 4,771,301

DATED : September 13, 1988

INVENTOR(S) : Masanori Yamada

It is certified that error appears in the above-identified patent and that said Letters Patent is hereby corrected as shown below:

COLUMN 1:

Line 60, "2 respectively." should read --2, respectively.--.

COLUMN 2:

Line 30, "$SW_3$ respectively." should read --$SW_3$, respectively.--.

COLUMN 4:

Line 3, "the pulse and a" should read --a pulse and the--;

Line 46, "other. A1-" should read --other. ¶ A1- --; and

Line 47, "foregoing, the embodiments," should read --foregoing embodiments,--.

UNITED STATES PATENT AND TRADEMARK OFFICE
CERTIFICATE OF CORRECTION

PATENT NO. : 4,771,301
DATED : September 13, 1988
INVENTOR(S) : Masanori Yamada

It is certified that error appears in the above-identified patent and that said Letters Patent is hereby corrected as shown below:

COLUMN 5:

Line 2, "unti" should read --unit--; and

Line 36, "said flash tube stops" should read --said flash tubes stop--.

COLUMN 6:

Line 8, "said flash tube stops" should read --said flash tubes stop--; and

Line 45, "and" should be deleted.

COLUMN 7:

Line 1, "firsing stop control circuit" should read --firing stop control circuit--.

Signed and Sealed this

Seventeenth Day of October, 1989

Attest:

DONALD J. QUIGG

*Attesting Officer*     *Commissioner of Patents and Trademarks*